March 2, 1948.  B. B. JACOBSEN ET AL  2,436,808
MULTIVIBRATOR
Filed June 2, 1942  3 Sheets-Sheet 1
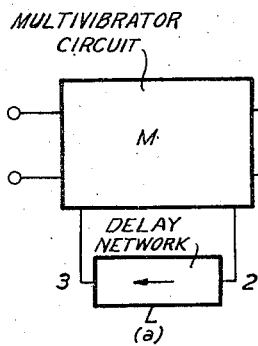
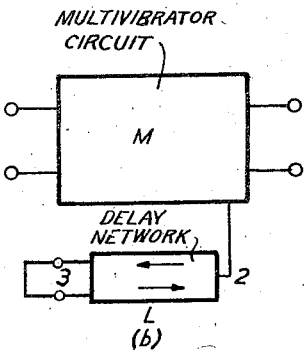
FIG. 1.
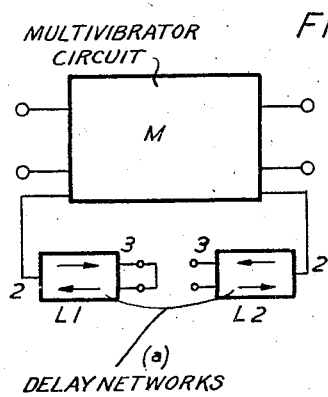
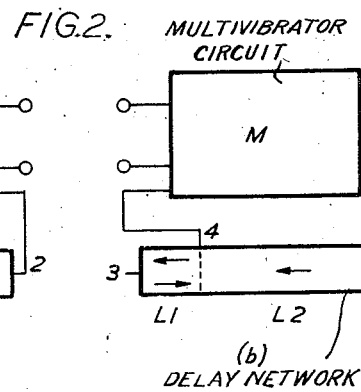
FIG. 2.
FIG. 3.
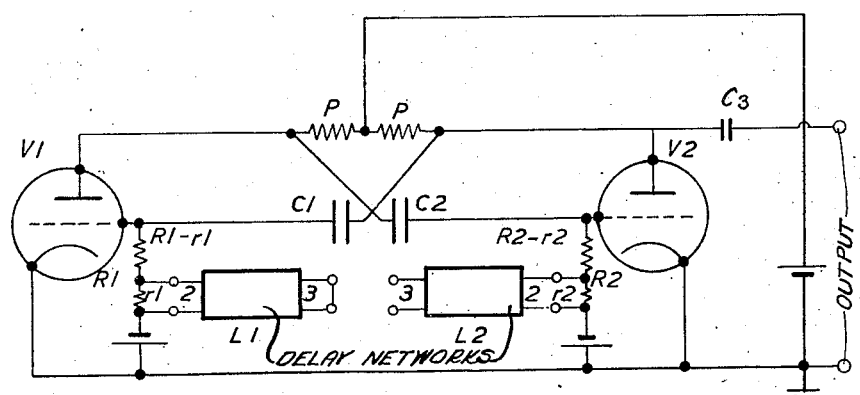
INVENTORS
B. B. Jacobsen
M. M. Levy
BY
Loyd Hall Sutton
ATTORNEY INVENTORS
BENT BULOW JACOBSEN
MAURICE MOISE LEVY
BY
*Edward D. Phinney*
ATTORNEY

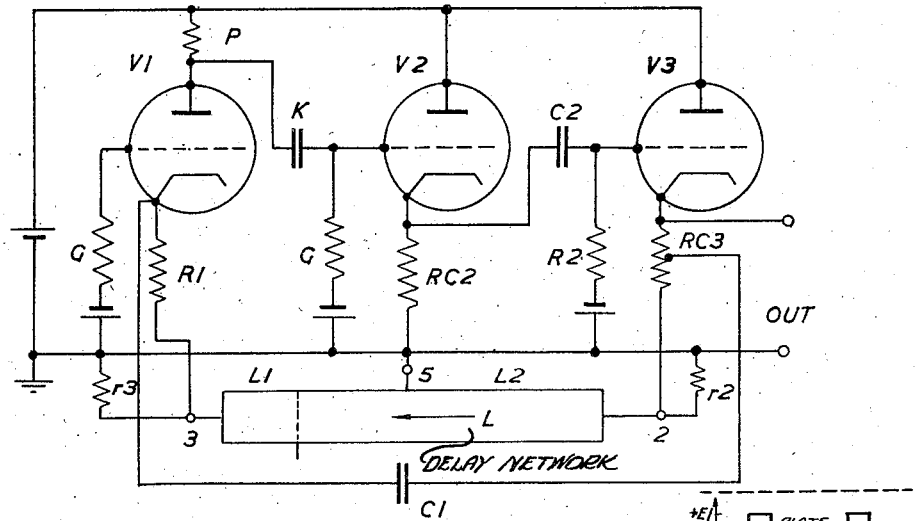
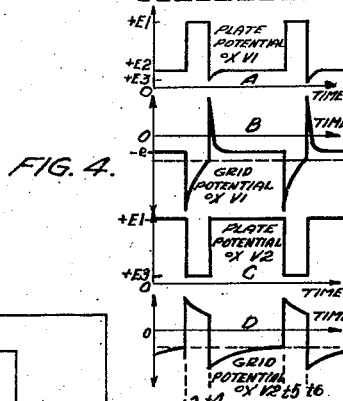
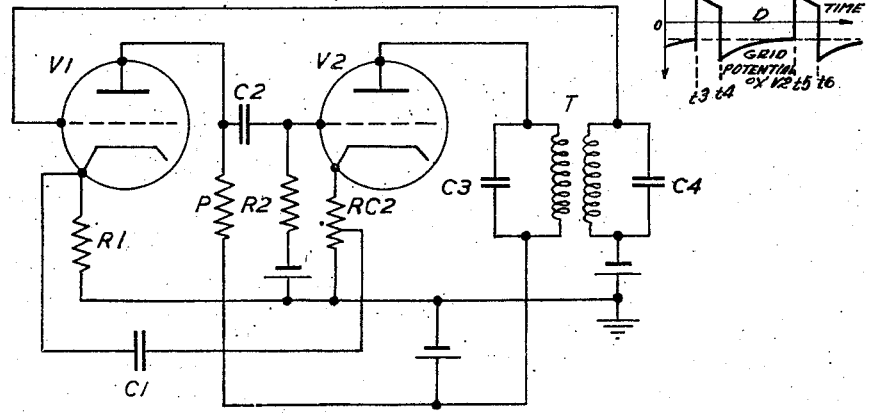

Patented Mar. 2, 1948

2,436,808

UNITED STATES PATENT OFFICE 2,436,808

MULTIVIBRATOR

Bent Bülow Jacobsen and Maurice Moïse Lévy, London W. C. 2, England, assignors to Standard Telephones and Cables Limited, London, England, a British company Application June 2, 1942, Serial No. 445,510
In Great Britain July 8, 1941

12 Claims. (Cl. 250—36)

This invention relates to the improvement of multivibrators for producing regularly repeated electrical impulses, and in particular concerns the stabilisation of the duration and/or of the frequency of repetition of the impulses.

It is well known that multivibrators of the ordinary type whose operation depends upon the periodical charge and discharge of condensers through resistances in circuits involving thermionic valves and like devices, are liable to be unstable in their operation and in particular the frequency of repetition of the impulses is often variable and dependent upon external factors such as battery supplies. In order to stabilise the operation, it has in the past been found necessary to supply synchronising signals of constant frequency from an external source such as a thermionic valve oscillator. This arrangement is costly and inconvenient and moreover usually requires that the frequency variation of the multivibrator should remain within certain relatively narrow limits to enable the synchronising source to function without getting out of step.

Accordingly, the present invention provides arrangements of the thermionic multivibrator type in which the impulses produced are accurately stabilised as regards duration, or frequency of repetition or both, by simple circuit means operated by the impulses, and not containing any source of electrical power.

The synchronising signals are obtained by means of delay networks in such manner that delayed impulses are obtained from one part of the circuit and introduced into another (or the same) part and cause the production of the impulses by a sort of trigger action, so that the period of repetition (or the duration) of the impulses will be determined by the time delay in the network, which can be very accurately fixed. The delay may either be produced by direct transmission through the network, or by reflection at the distant end, where the terminals may be short circuited, or left open or may be connected to some impedance calculated to produce a desired type of reflection.

It is also possible by suitable design or termination of the delay network, to produce delayed impulses of modified form for particular applications.

Stabilisation may also be effected in a different manner, whereby the oscillations produced in a resonant circuit tuned to the repetition frequency (or one of its harmonics) are used as synchronising signals instead of impulses delayed in a network.

In one embodiment of the invention, delay networks are introduced into the circuit of a well known type of multivibrator employing two thermionic valves and two condenser-resistance timing circuits, for producing impulses stabilised as regards frequency of repetition, or duration, or both.

In another embodiment, a multivibrator comprises an amplifier in which two timing circuits have been suitably located, and a delay network for stabilising the frequency of repetition and/or the duration of the impulses. The amplifier may be of a type involving a cathode follower valve or valves, and adapted for producing impulses of very high peak power by an arrangement of high efficiency involving the use of plate potential much above the normal values specified for the valves.

In a further embodiment, a multivibrator adapted as a harmonic generator comprises an amplifier containing in addition to the two timing circuits, a resonant circuit used for providing the synchronising signals.

The invention will be better understood after a consideration of the following detailed description and with reference to the accompanying drawings in which Figs. 1 and 2 show block schematics of multivibrators involving delay networks;

Fig. 3 shows an embodiment in which delay networks are applied to a common known type of multivibrator circuit.

Fig. 4 shows operation curves of the circuits; and Figs. 5, 6, 7, 8 and 9 show additional embodiments of our invention.

Figure 5:
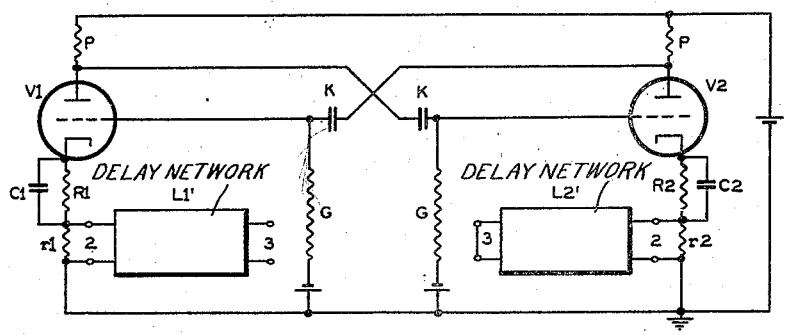

In the various circuits shown in the above quoted figures certain accessories necessary for the operation of the valves but not essential to the present invention are indicated. Thus positive plate batteries and negative grid biassing batteries for valves are indicated by the usual symbols, which however are not to be taken as implying any particular method of supplying the necessary potentials nor any particular values of the same. Any arrangements appropriate to the valves and circuits may be used and would be provided suitably by those skilled in the art. The valves are shown as triodes with indirectly heated cathodes (with the heating circuits omitted for clearness) but valves with any number of electrodes may be used as may be convenient according to circumstances.

According to the present invention the synchronizing signals which are applied to the grids so that they are suddenly brought to the cut-off point at the right time are obtained from the multivibrator impulses themselves by means of delay networks (or other means to be explained later) instead of from an external source, and it becomes therefore practicable to stabilise simultaneously the duration of the impulse and also the repetition frequency which, according to the methods hitherto used, would in general require two external synchronising sources. In Fig. 1 are shown in block schematic form two methods by which synchronisation is obtained by means of a delay network. M is a multivibrator circuit of any known form and L is a delay network which may be in the form of an artificial line characterizable as having linear bilateral impedances and is preferably such that the delay produced is substantially independent of frequency over the important working range though this is not essential. In Fig. 1(a) the network is shown with its input circuit 2 connected to some suitable point in the multivibrator from which impulses can be picked up, and with its output circuit 3 connected to some other point where the impulses delayed by transmission through the delay network can be delivered in order to unblock the circuit. In Fig. 1(b) the output circuit 3 is not connected to M but is short circuited (or left unconnected) so that the impulses picked up from M are reflected back to the same point where the unblocking may be arranged to occur. In some cases it may be desirable to terminate the output 3 with some suitable impedance in order to modify the reflected impulses.

The manner in which these networks stabilise the operation of the circuit will be understood from the explanation given below in connection with Fig. 2.

With the arrangements indicated in Fig. 1, it will only be possible to stabilise either the duration of the impulses, or the frequency of repetition. If it should be desired to stabilise both, arrangements shown in Fig. 2 involving two delay networks (or the equivalent of two networks) may be used. In Fig. 2(a) two delay networks L1 and L2 are connected with their input circuits 2 to suitable points in the multivibrator circuit M, their output circuits 3 being arranged for the production of suitable reflections. The delay network L1 may, for example, be used to stabilise the duration of the impulses, and its output circuit 3 will then preferably be short circuited. The network L2 will then be used for stabilising the frequency of repetition and its output circuit will preferably be left open.

In Fig. 2(b) is shown an alternative arrangement whereby the two networks L1 and L2 are themselves each a part of a single delay network, having an input circuit 2, an output circuit 3 and a tapping point 4. The input circuit 2 is connected to a suitable point in the multivibrator M for picking up the impulses, and the output circuit 3 is suitably arranged for reflecting impulses arriving there. The tapping point 4 is connected to some other suitable point in the multivibrator.

The arrangement of Fig. 2(b) may thus be regarded as a combination of Figs. 1(a) and 1(b). The network L2 in Fig. 2(b) may control the frequency of repetition by means of impulses delayed by transmission from the input circuit 2 to the tapping point 4, and duration of the impulses will then be controlled by L1 by means of impulses reflected back to 4 from the output circuit 3. The operation will be in principle as already explained above, but will differ in detail owing to the different arrangements for picking up and delivering the impulses. It will be noted however that the reflected impulses will be transmitted right back to the input circuit 2 of L2. This is not necessarily objectionable, and even may be useful, but if desired the effect can be largely avoided by terminating the output circuit 3 in a suitable manner to produce reflected impulses of small amplitude.

It will easily be appreciated that the network L of Fig. 1(b) may correspond to either L1 or L2 in Fig. 2(a) and will function as described to control either the duration of the impulses or the repetition frequency. Likewise the network L in Fig. 1(a) might correspond to L2 in Fig. 2(b) and would then control the repetition frequency. By suitable arrangement of the connections it could clearly be made to control instead the duration of the impulses.

In Fig. 3 is shown a multivibrator circuit to which delay networks have been added for controlling the operation according to Figs. 1(b) or 2(a). Two such networks L1 and L2 are shown.

The operation of the network may be understood with reference to Figs. 3 and 4. In Fig. 4, curves 4A and 4B represent the variation with time of plate potential and grid potential for the valve V1, and 4C and 4D represent the same curves for valve V2. All the curves relate to the same time axis. The grid of valve V1 is supposed to be biased somewhat above the cut-off point, which is indicated by the dotted line in Fig. 4B. The cut-off point of V2 is also shown in Fig. 4D by the dotted line and its grid is suitably biased as explained below.

Referring to Fig. 4D, the grid potential of V2 is supposed to have reached the cut-off point at time $t3$ after the previous cycle. Just before this moment the plate potential will be at its maximum value $+E1$ because the plate current is zero (Fig. 4C). The grid potential of V1 will be substantially equal to the bias voltage $-e$, (Fig. 4B), and the plate potential will be at a relatively low value $+E2$ because of the anode current which is flowing (Fig 4A). However, as soon as the potential of the grid of V2 reaches the cut-off, the plate current begins to flow and the potentials of the grids and plates of V1 and V2 practically instantaneously assume the values indicated by the curves at the beginning of the interval $t3-t4$, because of the cross connection of the circuit. As shown in Fig. 4B, the grid of V1 is taken far below the cut-off and so the plate voltage remains constant at the maximum value $+E1$. The condenser C1 charges up rather rapidly, and the grid potential of V1 rises to the cut-off. At the same time, and in the same way the grid potential of V2 falls much more slowly due to the charging of C2 as indicated in Fig. 4D.

The grid potential of V1 reaches the cut-off at time $t4$, the plate potential having remained constant throughout the interval $t3-t4$ at the maximum value E1. At the instant $t4$, anode current begins to flow in V1 and the potentials all change practically instantaneously in the reverse direction. As the grid potential of V2 has fallen during the interval $t3-t4$, it will be suddenly reduced some way below the cut-off, and the corresponding plate potential will assume the maximum value $+E1$. Similarly the grid of V1 will be taken suddenly up to a high positive potential well above the saturation point of the valve, the plate potential of which will assume its minimum value $+E3$. Meanwhile, the grid potential of V1 has returned practically to the bias value —e in a relatively short time due to the grid current, and the corresponding plate potential has risen to the value E2. The grid potential of V2 will also rise, but as the voltage difference E2—E3 is small compared with the drop of the grid voltage of V2 below the cut-off, the grid of V2 will remain below the cut-off and will block any further operation until the end of the relatively long period $t4$—$t5$ defined by the time constant C2, R2. At $t5$ the grid voltage of V2 reaches the cut-off, when the cycle is repeated. It will be noted that during the period $t3$—$t4$ the plate voltage of V2 assumes the minimum value +E3, since the grid voltage is taken above the saturation point. It will remain substantially constant at this value until the grid potential has had time to fall below the saturation point. It will thus be seen that nearly symmetrical square topped impulses are generated at the plate of V1 and practically symmetrical inverted impulses are generated at the plate of V2. The frequency of repetition is controlled by the timing circuit C2, R2 which operates by blocking the valve V2 for the desired period. It will be clear that the grid bias of this valve has to be adjusted appropriately so that the curve of Fig. 4D is suitably located with respect to the cut-off and saturation points of the valve.

It will also be clear that the periods $t3$—$t4$ and $t4$—$t5$ are dependent upon the properties of the valves as well as upon the timing circuits C1, R1 and C2, R2 and will accordingly be difficult to maintain constant.

When the delay network output circuit is short circuited, the reflected impulses are of sign opposite to that of the original impulses, and when it is left open they are of the same sign. The network L1 will be arranged, for example, to pick up the impulses shown in Fig. 4C. The delay will be so arranged that the leading edge of each reversed reflected impulse returns after the time corresponding to the desired impulse duration, and the timing circuit C1, R1 (Fig. 3) will be arranged so that the duration of the impulses which would be produced in the absence of the delay network is slightly greater than the desired duration. Accordingly, the leading edge of the reversed impulse will return when the grid voltage shown in Fig. 4B has nearly but not quite reached the cut-off point, and will sharply bring it thereto thus unblocking the valve V1 (Fig. 3), and completing the impulse after a time defined by the delay network and not by the timing circuit. Similarly, network L2 may be arranged to pick up the impulses shown in Fig. 4A and to return them (with the same sign) after a time equal to the desired repetition period.

The timing circuit C2, R2 (Fig. 3) will be so arranged that the grid voltage of valve V2 (Fig. 4D) in the absence of the network L2 would have reached the cut-off a little later than the return of the leading edge of the reflected impulse, which on its arrival sharply unblocks the valve V2 and causes the generation of a new impulse after a time defined by the network L2 and not by the timing circuit C2, R2. These times may be very precisely determined by suitable choice of the network constants, and the variations due to external factors (e. g. temperature) can easily be made negligible by appropriate design of the network elements. The principal requirement for the timing circuits is that the times defined by them shall not at any time become less than the corresponding times defined by the delay network, but although these times may be allowed to become greater, a limit must somewhere be set to variation in this direction, otherwise the delay networks may cease to exert any control. This limit will not, however, be so narrow as to be difficult to meet, with the circuits in ordinary use.

Now referring more specifically to Fig. 3, it will be noted that the resistances R1 and R2 have each been tapped so as to divide them into two portions $r1$ and R1—$r1$, $r2$ and R2—$r2$, respectively. The delay networks L1 and L2 are bridged across $r1$ and $r2$ respectively. The arrangements for delivering the impulses to a load may be made in a number of well known ways such, for example by means of an amplifying valve not shown whose grid is coupled to the plate of one of the valves V1 or V2 through a condenser C3; or by direct connection to one of the resistances P.

The resistances $r1$ and $r2$ should preferably be chosen so that each delay network is terminated at its input terminals 2 with an impedance equal to its image impedance in order to avoid multiple reflections.

Assuming as before that the duration of the impulses is defined by the timing circuit C1, R1 and the repetition frequency by C2, R2, then according to the previous explanation L1 should be short circuited, and L2 should be left unconnected at the output terminals 3. By suitably choosing the ratios $r1/R1$ and $r2/R2$ the stabilising impulses may be given suitable amplitudes. Alternatively the amplitude may be controlled by terminating the network at the output terminals 3 with a suitable impedance by which means the amplitude of the reflected impulses can be adjusted.

Fig. 5 shows an arrangement alternative to Fig. 3 in which the timing circuits are placed in the cathode circuits of the valves, and the operation will be similar. If the duration of the impulses is extremely short as compared with the period of repetition, it may not be possible to get a sufficient drop in the grid potential of V2 in Fig. 3 in the time $t3$—$t4$ (see Fig. 4) to allow the circuit to remain blocked for the period $t4$—$t5$. By connecting the timing circuit C2, R2 in series with the cathode a larger drop can be obtained in the time because the plate current is then available for charging the condenser instead of the grid current. With this arrangement the timing circuit C1, R1 could be left connected as shown in Fig. 3 but an additional advantage of Fig. 5 is that the resistance R1 and R2 no longer shunt the plate circuit resistances P which in some cases may limit the possibilities of the circuit.

While, at the times $t3$ and $t4$, the drop and rise, respectively, in the cathode potential for instance of valve V1 will be gradual and along an exponential curve, it is possible to obtain a sharp impulse by inserting a small resistor $r1$, $r2$ in series with the two timing circuits R1, C1 and R2, C2. The voltage drop across this resistor will be proportional to that across the associated plate resistor P and the potential of the ungrounded terminal of $r1$, $r2$ will vary inversely with the respective plate voltage given in Figs. 4A and 4C. It is of course necessary to make the ratio between P and $r1$ or $r2$ sufficiently large so as not appreciably to reduce the grid voltages of the two valves.

In the circuit arrangement of Fig. 5, a network L1' has its input terminals 2 connected across the resistor $r1$ and a network L2' is similarly connected across the resistor $r2$. Network L1' serves to stabilize the duration of the impulses and differs from network L1, shown in other embodiments of the invention, in that its output terminals 3 are open circuited; accordingly, network L2' is provided for stabilizing the repetition frequency of the multivibrator and is short circuited in contrast with network L2 shown elsewhere in the drawings. The reason for this will be clear from the foregoing, in view of the fact that a positive synchronizing pulse in the cathode circuit is necessary for driving the associated grid below cut-off.

Figure 6:
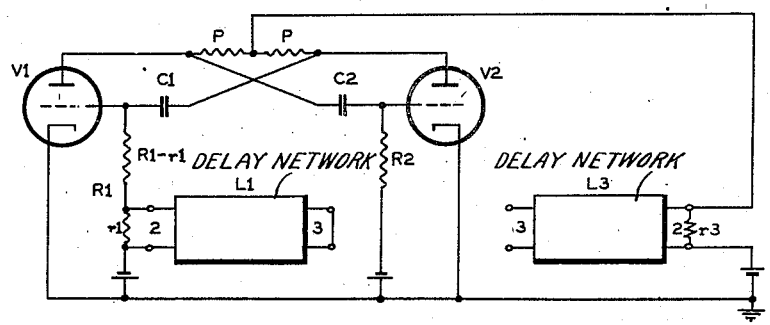

Experience shows that a very good way of synchronising a multivibrator is to apply synchronising signals simultaneously to the plates of the two valves V1 and V2. This may be done according to the present invention, as shown in Fig. 6, wherein the network L3 supplies the synchronising signals in the form of the reflected impulses. Since the plate resistances P of both valves are equal, the drop across the resistor $r3$ in series therewith will vary as the difference between the plate voltages of V1 and V2, corresponding at time $t3$ to the value $$(E1-E2)-(E1-E3)=E3-E2$$

as seen in Fig. 4. Hence a sharp negative impulse, the magnitude of which depends on the ratio $r3/P$, will be delivered at the time $t3$ to network L3 and will be returned from the open circuited ends 3 thereof, with the same polarity, at the time $t5$, serving to drive the grid of V1 beyond cut-off. While the same impulse will also tend to lower the grid potential of valve V2, this will be without effect due to the large positive voltage simultaneously applied thereto by way of condenser C2.

With the network L3 thus taking the place of L2, L2' in Figs. 3 and 5, a second network L1 or L1' may be connected in the same manner as in the modifications previously described. Thus, a network L1 is shown in Fig. 6 connected across the resistor $r1$, and its function in controlling the duration of each impulse is exactly as described earlier in this specification. Alternatively, network L3 may be short-circuited at terminal 3 and designed for stabilizing the impulse duration, and L1 will then be advantageously replaced by an open circuited delay network L2 adapted to maintain a desired frequency of repetition.

Thus it will be seen that by using any one of the three delay arrangements shown in Figs. 3, 5 and 6 either the duration or the frequency of reflection of the impulses may be stabilised, or by using any two of them, both may be simultaneously stabilised.

In Fig. 7 is shown a different type of multivibrator circuit to which a delay network is applied. This circuit consists of a three stage amplifier comprising valves V1, V2 and V3 with a back coupling through condenser C1 from the cathode of V3 to that of V1. The valves V2 and V3 are connected as cathode followers, and this arrangement is particularly suitable for the production of impulses with very high peak power by the use of valves of low power rating. Valve V2 may be a pentode having a normal voltage on the screen grid, but with an abnormally high plate voltage, but in Fig. 7 this valve is shown for simplicity as a triode for the purpose of explaining the circuit, whose working as regards the invention is not confined to the use of any particular valves or method of operating them. The cathode follower valves V2 and V3 may have the same plate voltage as V1, and are provided with cathode circuit resistances RC2 and RC3 so chosen that the potential of the cathode is always very nearly equal to the potential of the corresponding grid. By making the plate resistance P of V1 large enough, the desired voltage amplitude of the impulses is obtained, and the power is subsequently amplified in V2 and V3 without much changing the voltage. It is possible to give RC2 a value at least ten times lower than P, and RC3 a value at least 50 times lower. It will thus be seen that since the voltage of the impulses is not materially changed, the power may be multiplied at least 50 times.

The amplifier may be converted into a multivibrator in Fig. 7 by connecting a condenser C1 from a suitable tap on the cathode resistance RC3 of V3 to the cathode of V1 which is connected to ground through the resistance R1 and $r3$. The valves V2 and V3 are coupled through condenser C2 and resistance R2 as shown. The timing circuits are C1, R1 and C2, R2 as before; and C2, R2 could have been placed elsewhere, for instance between valves V1 and V2. The circuit operates in substantially the same manner as those previously described, namely, an operating parameter such as the repetition frequency is determined by the application of a synchronizing impulse to the input circuit of valve V1. The timing circuits C1, R1 and C2, R2 could be interchanged if desired.

Stabilisation is effected in the manner explained with reference to Figs. 1a or 2b. An unbalanced delay network L is connected with its input terminal 2 in series with the cathode resistance RC3 and its output terminal 3 in series with the resistance R1. The common terminal 5 is connected to ground. The delay will be so chosen that the valve V1 is triggered at the right time for stabilising the repetition frequency, the delayed impulses being of the same sign as the original ones. The network L will be preferably connected at either end to resistances $r2$ and $r3$ as shown having values such that it will be terminated with its image impedance in order to avoid reflections.

Figure 8:
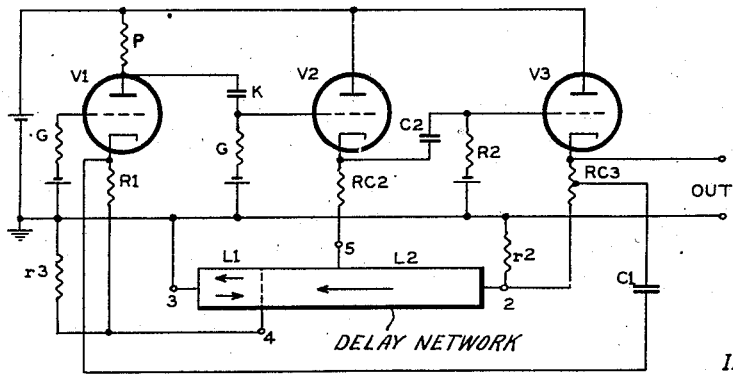

In Figure 8 the circuit of Figure 7 has been modified somewhat in order also to stabilise the duration of the impulses, the cathode resistance R1 is in this case connected to a tapping point 4 in L dividing it into two portions L1' and L2, as shown instead of to the output terminal 3. In this case the input of network portion L1 is connected across a part of the cathode resistance of V1 represented by resistor $r3$, just as the input of portion L2 is connected across a part of the cathode resistance of V3 consisting of the resistor $r2$. The impulses applied to terminal 4 will be reflected at the end 3 and returned to the cathode circuit of V1 where they may be utilized for controlling the operation of the multivibrator circuit. In order to reverse the polarity of the reflected impulses, the network portion L1 may be short-circuited, e. g. by connecting terminal 3 directly to ground as shown. It may, however in some cases be grounded through an impedance of a suitable value inserted between terminals 3 and 5. The delay in the portion L2 is chosen to stabilise the repetition frequency, and the delay in the portion L1 for the signals reflected at the short circuited end back to the tapping 4 is chosen to stabilise the duration of the impulses.

In the embodiments of the invention which have been so far described, the impulses, reflected or transmitted, which constitute the synchronising signals will often be of substantially the same form as the generated impulse applied to the delay network. This however is not essential and may not always be desirable. By use of suitably designed networks or arrangements, stabilising signals of modified form may be produced. For example it may be convenient to use a signal obtained by derivation of the generated impulse (that is, the stabilising signal has a form defined by a curve which is the first derivative of the curve defining the original impulse). Such signals may be produced by well known means: one way of doing this is to use delay network terminated in a condenser, in which case the reflected impulse has (as may be demonstrated experimentally) a form which is roughly that of the derivative of the original impulse.

In Fig. 9 is shown another multivibrator, primarily intended as a harmonic generator and having a tuned output circuit. This may be stabilised using delay networks according to the principles explained above, but an alternative method may also be used as shown in Fig. 9. The circuit is shown with two valves V1 and V2 but is otherwise similar to Fig. 7 and the corresponding elements are similarly designated. The plate current of V2 is taken through the primary winding of a transformer T tuned to a suitable harmonic by means of condensers C3 and C4. The secondary winding is connected back to the grid of valve V1. The alternating potential of this harmonic may be caused to unblock the circuit at the right time by suitable arrangements in a manner similar to the functioning of the impulses delayed in the network as previously described.

The amplifiers shown in Figs. 7, 8 and 9 may take various forms without affecting the main principles of the invention. Thus either may consist of any number of stages of amplification, and any of such stages may be arranged as cathode followers. Further the back coupling may be made between any two stages not necessarily the first and the last, and the timing circuits can be located in any of a number of different places in the circuit. It is also not essential that the delay networks or other stabilising means should be connected between the same stages as the back coupling.

It will be understood that the circuits described above have been given for illustrating the application of the invention, and are not intended to limit to the particular arrangements shown. Many other circuits and applications will occur to those skilled in the art.

What is claimed is:

1. A thermionic multivibrator for generating regularly repeated rectangular electrical impulses of short duration comprising two thermionic valves each having an anode, a cathode and at least one control electrode, the control grid of each valve being connected to the anode of the other valve with a timing condenser in said connection, a timing resistance connected between each control grid and the ground, a common source of anode potential for said valves, means for applying a biasing potential to said control grids, individual resistances being interposed between said common source and each anode, and a delay network for stabilizing the operation of said multivibrator and operated by impulses generated by said multivibrator without any other source of electric power, said network being connected to receive impulses generated by one of said valves and, after a predetermined interval, to deliver said impulses to one of said valves.

2. A thermionic multivibrator as claimed in claim 1 wherein said delay network is connected with its input circuit in series with part of the circuit of one of said valves, the other end of the network being left unconnected whereby impulses are reflected back through the network to stabilise the frequency of repetition of said impulses.

3. A thermionic multivibrator as claimed in claim 1 wherein said delay network is connected with its input circuit in series with part of the circuit of one of said valves, the other end of the network being short circuited whereby impulses are reflected back through said network to stabilise the duration of said impulses.

4. A thermionic multivibrator as claimed in claim 1 wherein said delay network is connected with its input circuit in series with said common source of anode potential.

5. A thermionic multivibrator as claimed in claim 1 wherein said delay network is connected with its input circuit in series with the control electrode circuit of one of said valves.

6. A thermionic multivibrator as claimed in claim 1 wherein said delay network is connected with its input circuit in series with said common source of anode potential, and having a second delay network connected with its input circuit in series with the control electrode circuit of one of said valves, one network having its other end left unconnected for stabilising the frequency of repetition of said impulses and the other network having its other end short circuited for stabilising the duration of said impulses.

7. A thermionic multivibrator for generating regularly repeated rectangular electrical impulses of short duration comprising a multistage valve amplifier, each valve having a cathode, an anode, and at least one control electrode, a subsequent valve of the amplifier having a resistance in its cathode circuit, means for supplying space current to each of said valves, means for applying a grid biasing potential to each of said valves, means including a timing condenser connecting the cathode of the first valve with a tapping point on said resistance, means including a timing resistance connecting the cathode of said first valve to ground, a timing circuit coupling the control electrode of a subsequent valve with the immediately preceding valve in the amplifier, said coupling circuit comprising a series condenser and a shunt resistance, and a delay network for stabilising the operation of said multivibrator and operated by impulses generated by said multivibrator without any other source of electric power, said network being connected with its input receiving impulses generated by one of said valves and its output delivering impulses to another of said valves after a predetermined interval.

8. A thermionic multivibrator as claimed in claim 7, having an unbalanced delay network with a plurality of terminals including a first terminal of fixed potential and a second and a third terminal both of variable potential, said first terminal being connected to ground, said second terminal being connected to said tapped resistance.

9. A thermionic multivibrator as claimed in claim 7, having an unbalanced delay network with a plurality of terminals including a first terminal of fixed potential and a second and a third terminal both of variable potential, said first terminal being connected to ground, said second terminal being connected to said tapped resistance and said third terminal being connected to the timing resistance associated with the cathode of the first valve.

10. A thermionic multivibrator as claimed in claim 7, having an unbalanced delay network with a plurality of terminals including a first terminal of fixed potential, a second terminal at one end of said network, a third terminal at an intermediate point on said network, said second and third terminals being both of variable potential, and a fourth terminal at the other end of said network, said first terminal being connected to ground, said second terminal being connected to said tapped resistance, said fourth terminal being connected to ground, and means connecting said third terminal with the timing resistance of said first valve.

11. A thermionic multivibrator of the self-oscillatory type adapted to serve as a primary generator of electrical oscillations, for generating regularly repeated rectangular impulses defined by a plurality of parameters including impulse duration and repetition frequency, comprising a first valve having a cathode, an anode and at least one control grid, a second valve having a cathode, an anode and at least one control grid, means including a timing circuit in the grid-cathode circuit of the first valve for coupling the input thereof to the output of the second valve, means including a timing circuit in the grid-cathode circuit of the second valve for coupling the input thereof to the output of the first valve, the said valves being responsive to synchronizing signals for stabilizing at least one of said parameters at a desired value, and means for producing the synchronizing signals, said means including a delay network consisting of a combination of linear bilateral impedance elements for deriving an impulse from the output of one of said valves and applying said impulse after a predetermined time interval to an input electrode of one of said valves.

12. A thermionic multivibrator of the self-oscillatory type adapted to serve as a primary generator of electrical oscillations, for generating regularly repeated rectangular impulses defined by a plurality of parameters including impulse duration and repetition frequency, comprising a first valve having a cathode, an anode and at least one control grid, a second valve having a cathode, an anode and at least one control grid, means including a timing circuit in the grid-cathode circuit of the first valve for coupling the input thereof to the output of the second valve, means including a timing circuit in the grid-cathode circuit of the second valve for coupling the input thereof to the output of the first valve, the said valves being responsive to synchronizing signals for stabilizing at least one of said parameters at a desired value, and means including a resistance element in series with an electrode of one of said valves for producing the synchronizing signals, said last means further including at least part of a delay network consisting of a combination of bilateral impedance elements adapted to derive an impulse from said resistance element and to return it thereto after a predetermined time interval and with a predetermined polarity.

BENT BÛLOW JACOBSEN.
MAURICE MOÏSE LÉVY.

REFERENCES CITED

The following references are of record in the file of this patent:

UNITED STATES PATENTS

| Number | Name | Date |
|---|---|---|
| 2,158,285 | Koch | May 16, 1939 |
| 2,212,173 | Wheeler | Aug. 20, 1940 |
| 2,212,420 | Harnett | Aug. 20, 1940 |
| 2,212,967 | White | Aug. 27, 1940 |
| 2,221,666 | Nelson | Nov. 12, 1940 |
| 2,265,996 | Blumlein | Dec. 16, 1941 |
| 1,744,835 | Ohl | Jan. 28, 1930 |
| 2,283,653 | Siemens | May 19, 1942 |
| 2,265,290 | Knick | Dec. 9, 1941 |
| 2,401,405 | Bedford | June 4, 1946 |
| 2,404,047 | Flory et al. | July 16, 1946 |